United States Patent [19]

Mura et al.

[11] Patent Number: 5,432,911
[45] Date of Patent: Jul. 11, 1995

[54] CONTROLLERS REQUEST ACCESS WITHIN ONE BUS CYCLE CAUSING HARDWARE-WAIT TO STALL SECOND CONTROLLER WHEN FIRST CONTROLLER IS ACCESSING AND SECOND CONTROLLER IS STILL REQUESTING ACCESS

[75] Inventors: Joji Mura; Futoshi Nakai, both of Neyagawa; Hiroshi Sakai, Settsu, all of Japan

[73] Assignee: Matsushita Electric Works, Ltd., Osaka, Japan

[21] Appl. No.: 913,690

[22] Filed: Jul. 14, 1992

[30] Foreign Application Priority Data

| Jul. 15, 1991 | [JP] | Japan | 3-172896 |
| Dec. 24, 1991 | [JP] | Japan | 3-340450 |
| Jan. 28, 1992 | [JP] | Japan | 4-012514 |

[51] Int. Cl.⁶ .................. G06F 13/00; G06F 13/14; G06F 13/30; G06F 13/36
[52] U.S. Cl. .................. 395/275; 395/725; 395/425; 395/550; 364/131; 364/138; 364/143
[58] Field of Search .................. 395/200, 275, 725

[56] References Cited

U.S. PATENT DOCUMENTS

| 3,959,775 | 5/1976 | Valassis et al. | 340/172.5 |
| 4,442,504 | 4/1984 | Dummermuth et al. | 395/725 |
| 4,549,273 | 10/1985 | Tin | 364/200 |
| 4,858,101 | 8/1989 | Stewart et al. | 395/275 X |
| 4,937,777 | 6/1990 | Flood et al. | 395/325 |
| 5,019,966 | 5/1991 | Saito et al. | 364/200 |
| 5,301,330 | 4/1994 | Tran | 395/725 |

FOREIGN PATENT DOCUMENTS 0399204 11/1990 European Pat. Off. .
WO90/00276 1/1990 WIPO .

OTHER PUBLICATIONS

European Search Report dated Jul. 5, 1993.

Primary Examiner—Thomas C. Lee
Assistant Examiner—Rehana P. Krick
Attorney, Agent, or Firm—Armstrong, Westerman, Hattori, McLeland & Naughton

[57] ABSTRACT

A multi-CPU programmable controller which operates to access one of a plurality of I/O interface units through a common I/O bus for controlling one of a plurality of equipments each connected to each associated one of the I/O interface units. The programmable controller includes a pair of controllers, each of the pair including an individual CPU for generating an access signal for selectively accessing one of said I/O interface units through the common I/O bus for control thereof within one bus cycle. Each of the pair of controllers operates in accordance with a specific program independently from each other. The programmable controller further includes a base board for mounting controllers together with the common I/O bus as well as the I/O interface units: bus arbitrating device, provided on the base board, for generating a single sampling clock. The bus arbitrating device supervises the access signals from the pair of controller means such that the bus arbitrating device determines, when the two access signals from the controllers are respectively detected at the same timing within the one bus cycle, whether to provide priority to one of the pair of controllers over the other in accordance with a predetermined priority and to assume that one of the pair of controllers as a prior controller and the other one as a posterior controller.

6 Claims, 16 Drawing Sheets

FIG.12
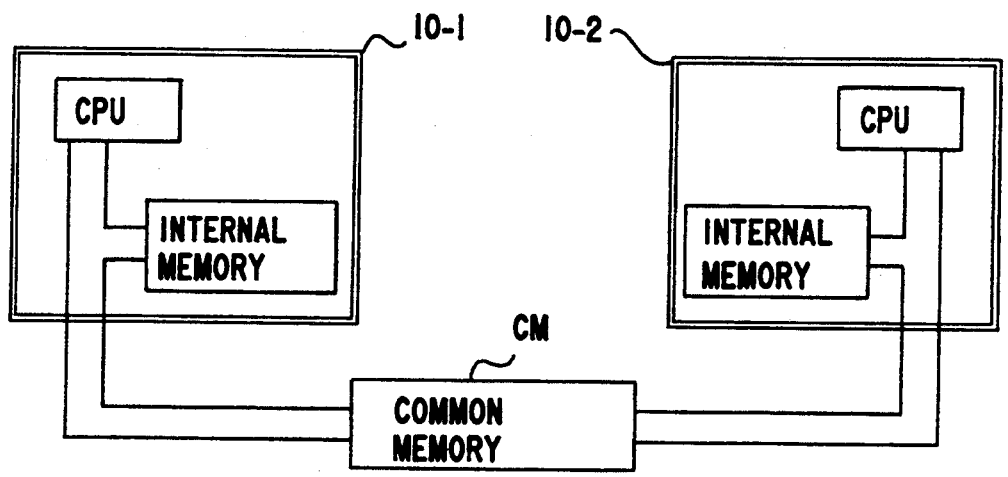
FIG.13A
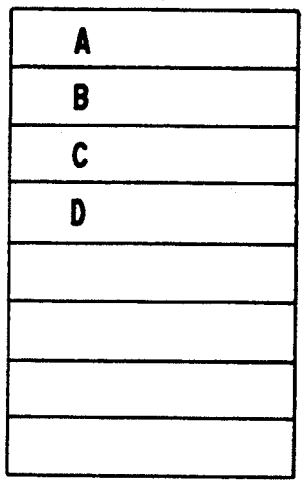
FIG.13B
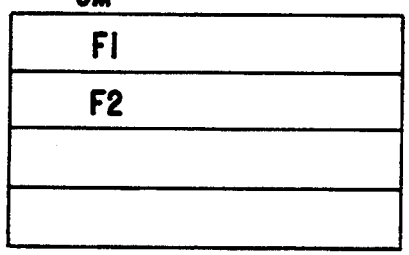
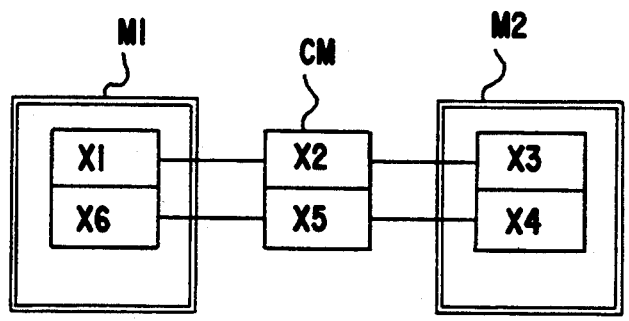
FIG.14

FIG.17A
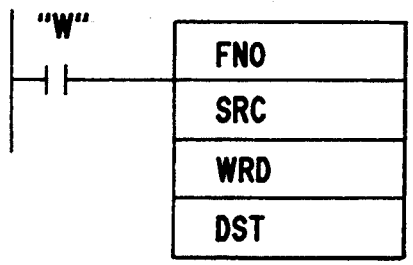
FIG.17B
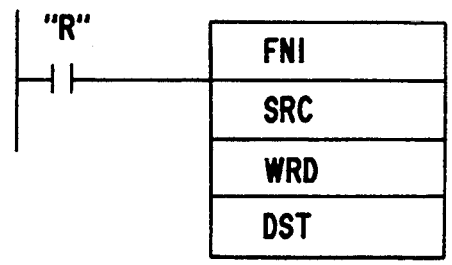
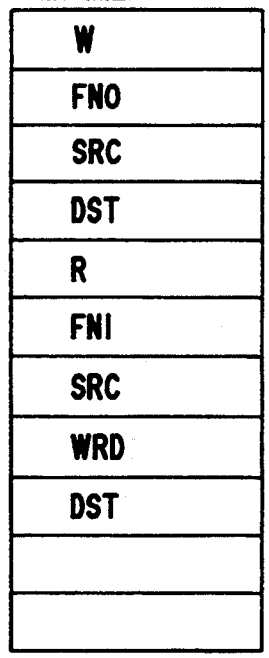
FIG.18A
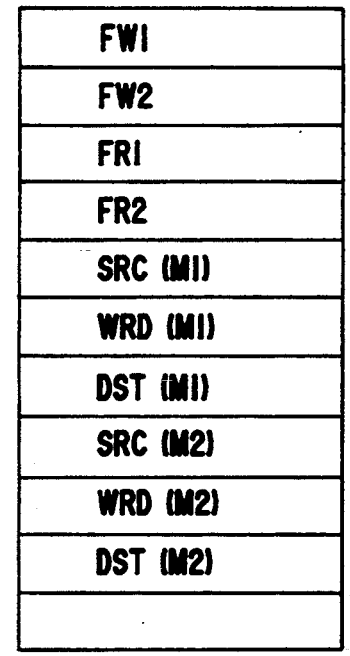
FIG.18B

CONTROLLERS REQUEST ACCESS WITHIN ONE BUS CYCLE CAUSING HARDWARE-WAIT TO STALL SECOND CONTROLLER WHEN FIRST CONTROLLER IS ACCESSING AND SECOND CONTROLLER IS STILL REQUESTING ACCESS

BACKGROUND OF THE INVENTION

1. Field of the Invention

The present invention is directed to a multi-CPU programmable controller, and more particularly to such programmable controller having two or more controller unit including individual CPUs which operate independently from each other to access one of a plurality of I/O interface units through a common I/O bus for controlling the associated one of the equipments respectively connected to the I/O interface units.

2. Description of the Prior Art

A multi-CPU Programmable controller having two or more CPUs, already known in the art, is designed to include a master controller unit with a master CPU [referred to as master CPU unit] and one or more slave CPU controller units with individual slave CPUs [referred to as salve CPU unit]. In this conventional system, the master CPU unit is responsible for managing to operate a plurality of I/O interface units over the slave CPU unit or units for controlling equipments or control devices connected respectively to the I/O interface units. For example, when activating the equipments, the master CPU unit collects data from the slave CPU unit or units through a common memory for operating the I/O interface units based upon thus collected date. When, on the other hand, making data-input to the master and slave CPU units, the master CPU unit is also responsible for respectively collecting data from the individual equipments through the I/O interface unit and distributing the data to the slave CPU units through the common memory. In this prior system, therefore, the slave CPU unit is not allowed to control the I/O interface units or the associated equipments independently of the master CPU unit. Consequently, the prior system suffers from the following drawbacks.

1) The master CPU units is required to have increased burden for the control of the I/O interface units; and
2) The slave CPU is disabled when the master CPU is stopped.

Further, it is possible to provide another programmable controller with two controller units with individual CPUs in which the two controller units operate alternately as a master CPU unit and a slave CPU unit for controlling a plurality of I/O interface units and corresponding equipments or control devices connected thereto through a common I/O bus. In this system, however, the slave CPU unit is required to monitor the master CPU unit accessing the I/O interface unit in order to take over and access instead the corresponding I/O interface unit through the common I/O bus. This is possible only with a software monitoring the status of the CPU units and therefore suffers from a loss time in arbitrating between the CPU units.

SUMMARY OF THE INVENTION

The above problems and insufficiencies have been eliminated in a multi-CPU programmable controller of the present invention. The multi-CPU programmable controller in accordance with the present invention operates to access one of a plurality of I/O interface units through a common I/O bus for controlling one of a plurality of equipments or control devices connected to the I/O interface units. The system comprises a pair of controller units with individual CPUs which operate in accordance with specific programs independently from each other such that each controller unit generates an access signal to access one of the I/O units for controlling the associated equipment within one bus cycle. The controller units, I/O bus and I/O units are mounted on a single base board. The board includes a bus arbitrator having a sampling clock and supervising access signals from the two controller units to determine based upon a timing of the sampling clock which of the controller units is first to generate the access signal when the access signals are received within the one bus cycle from the two controller units; thereby, giving priority to one of the two controller units over the other and assuming the one controller units as a prior controller unit and the other controller unit as a posterior controller unit. The bus arbitrator allows the prior controller unit to use the common I/O bus and access corresponding one of the I/O interface units, while giving a hardware-wait signal in order to stall the posterior controller unit so long as the posterior controller unit generates the access signal within the bus cycle during which the prior controller units continues to access the corresponding I/O interface unit, and allows the posterior controller unit to use the common I/O bus and access a corresponding I/O interface unit upon completion of the access from the prior controller unit to the corresponding I/O interface unit. With such a structural arrangement, two of the controller units can operate substantially independently from each other in a sense that one of the controller units does not require to interact with the other controller units, but simply follows a sequence order determined by the bus arbitrator. Accordingly, it is a primary object of the present invention to provide a multi-CPU programmable controller of unique configuration in which the controller units with individual CPUs are capable of controlling the corresponding I/O interface units independently from each other, without requiring any specific user program which might be otherwise necessary in each one of the controller units for monitoring the other controller unit.

In a preferred embodiment, the bus arbitrator is designed to generate two sampling clocks of different phases for judging the on-coming access signals from the two controller units respectively at the different timings defined by the out-of-phase sampling clocks. With this scheme, the bus arbitrator can acknowledge no concurrent access signals from the two controller units within the one bus cycle; thereby, successfully avoiding the contention between the two controller units in judging priority therebetween.

It is therefore another object of the present invention to provide a multi-CPU programmable controller which is capable of readily and effectively avoiding the contention between the two controller units and judging the priority therebetween.

The base board is formed with first and second slots for receiving therein the controller units, respectively, and is also provided with an I/O interface unit allocator. The allocator includes means for respectively correlating the first and second slots with the two controller units, and means for setting common and exclusive use data for each one of the I/O interface units. The "common use data" means the corresponding I/O interface unit is commonly controlled by the two controller unit, and by the "exclusive use data" is meant that the corresponding I/O interface unit is exclusively controlled by one of the controller units which is correlated with a particular one of the slots. With the inclusion of the I/O interface unit allocator, there is no need to rely on a user program or software for interlocking the I/O interface units to the controller units. Instead, such interlocking is simply made by a hardware scheme so that the system can be free from the rather complicated user defined software or program. Further, because of such hardware interlocking between the I/O interface units and the controller units, the I/O interface unit exclusively interlocked to the one controller units can not well prevented from receiving error signal, for example, initialization signal which should be directed to the other I/O interface unit or units, whereby the I/O interface units can be safely controlled.

It is therefore a further object of the present invention to provide a multi-CPU programmable controller in which the individual I/O interface units can be interlocked in a hardware scheme to the two controller units for effective and safe control of the I/O interface units.

In order to exchange data between the controller units, the system utilizes a common memory in the form of a dual-port RAM which is provided exteriorly or separately of the controller units and is interconnected to internal memories respectively within the controller units. In one scheme, the internal memory of each controller unit is configured to have a particular exchange data area for storing data to be exchanged between the controller units through the dual-port RAM under the control of the controller unit so that the data stored in the particular exchange data area in the internal memory of each one of the controller units can be automatically transferred through the common memory, i.e., dual-port RAM to the exchange data area in the internal memory of the other controller unit without requiring any additional user defined program for control of the dual-port RAM.

Alternatively, each of the controller units is designed to have an instruction which designates specific location in the internal memory of each one of the controller units for transferring data specified by that location between the internal memories through the dual-port RAM. Also, in this scheme, such instruction can be internally executed in accordance with the user defined program for control of the I/O interface units without requiring any additional particular user program for the control of the dual-port RAM.

It is therefore an additional object of the present invention to provide a multi-CPU programmable controller which is capable of eliminating the use of a user defined program for control of the dual-port RAM; thereby, enabling to the simplification of the user program for control of the I/O interface units.

The present invention discloses a further advantageous feature for a system configuration in which three or more controller units, each including a CPU, cooperate to control a plurality of the I/O interface units through the common I/O bus.

These and still other objects and advantageous features will become more apparent from the following detailed description of the preferred embodiments of the present invention when taking in conjunction with the attached drawings.

BRIEF DESCRIPTION OF THE DRAWINGS

FIG. 12 is a greatly simplified block diagram illustrating the relation among the controller units with individual internal memories and a common memory of the above controller system of FIG. 1;

FIGS. 13A and 13B are schematic views illustrating the contents of the internal memories of the controller units and the common memory, respectively;

FIG. 14 is a schematic view illustrating data transfer between the internal memories of the controller units through the common memory;

FIGS. 17A and 17B are schematic views illustrating data transfer instructions for writing and reading data of the internal memory of one controller unit to that of the other controller unit for exchanging the data between the internal memories of the two controller unit by the use of data transfer instruction in accordance with a modification of the above embodiment;

FIGS. 18A and 18B are schematic views illustrating the contents of the internal memories of the controller units and the common memory, respectively for exchanging the data between the internal memories of the two controller units by the use of the data transfer instruction of FIGS. 17A and 17B.

DETAILED DESCRIPTION OF THE PREFERRED EMBODIMENT

Figure 1:
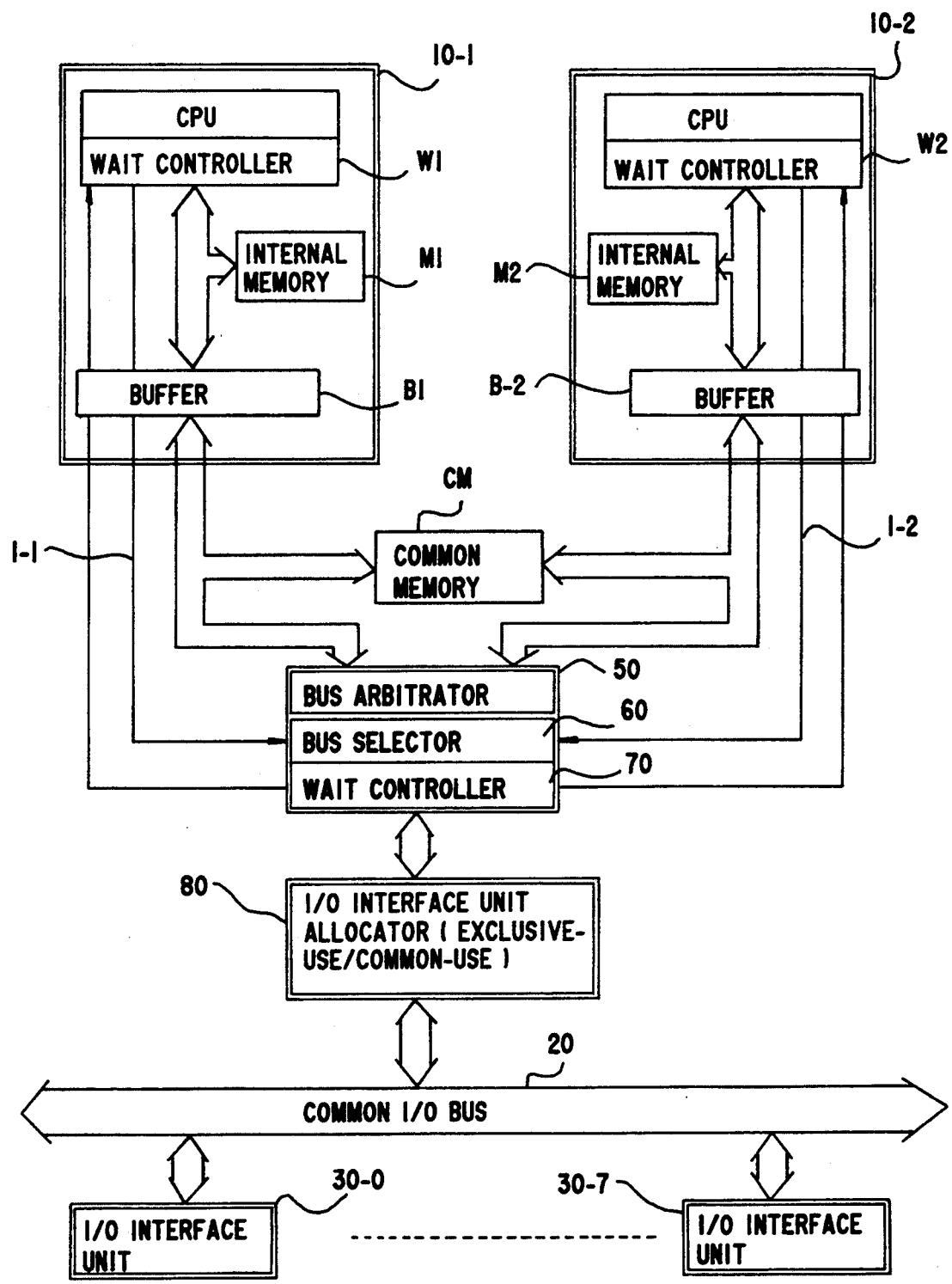
FIG. 1 is a block diagram illustrating a system of a multi-CPU programmable controller in accordance with a preferred embodiment of the present invention.
Figure 2:
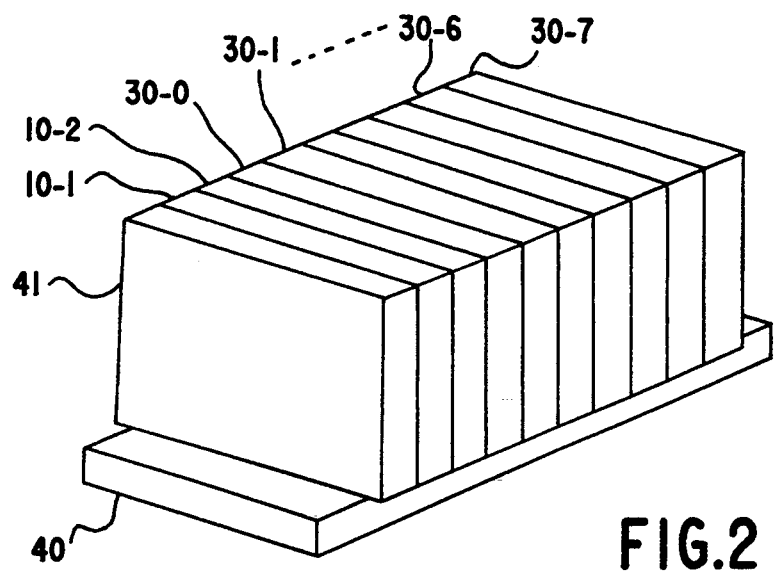
FIG. 2 is a schematic perspective view of the programmable controller with a base board mounting thereon two controller units and eight I/O interface units.

Referring now to FIG. 1, a multi-CPU programmable controller in accordance with a preferred embodiment of the present invention includes a pair of controller units 10-1 and 10-2 each including a CPU, wait controller W1, W2, internal memory M1, M2 and a buffer B1, B2. The controller units 10-1 and 10-2 are connected through a common I/O bus 20 to a plurality of I/O interface units 30-0 to 30-7 for controlling equipments or control devices wired respectively to the I/O interface units 30-0 to 30-7. The controls by the controller units 10-1 and 10-2 are made substantially independently from each other in accordance with particular programs for the individual CPUs. The controller units 10-1 and 10-2 are presented into modular packages mounted on a base board 40, as shown in FIG. 2, together with the I/O interface units 30-0 to 30-7 and a power unit 41 for energization of the controller system. The base board 40 is provided with a common memory CM disposed externally of the controller units for exchanging data between the internal memories M1 and M2 of the controller units 10-1 and 10-2. The base board 40 is also provided with a bus arbitrator 50 and an I/O interface unit allocator 80.

The I/O interface unit allocator 80 is provided to correlate the individual I/O interface units 30-0 to 30-7 with the controller units 10-1 and 10-2 such that each I/O interface unit is set to be exclusively controller by one of the controller units or commonly controlled by the two controller units 10-1 and 10-2, the detail of which will be discussed later. Each of the CPUs produces a bus access signal through the corresponding one of the buffers B1 and B2 and through a local I/O bus 1-1, 1-2 to the bus arbitrator 50 during the execution of controlling the corresponding I/O interface unit or units, or one bus cycle determined at the wait controller W1, W2 for that execution. The bus arbitrator 50 is provided to determine priority between the controller units 10-1 and 10-2 or the CPUs thereof in controlling the I/O interface units 30-0 to 30-7, when it is recognized that one of the controller units 10-1 and 10-2 produces the bus access signal, while the other controller unit produces the bus access signal, or during the bus cycle of the other controller unit executing the operation of controlling the I/O interface unit or units.

Figure 3:
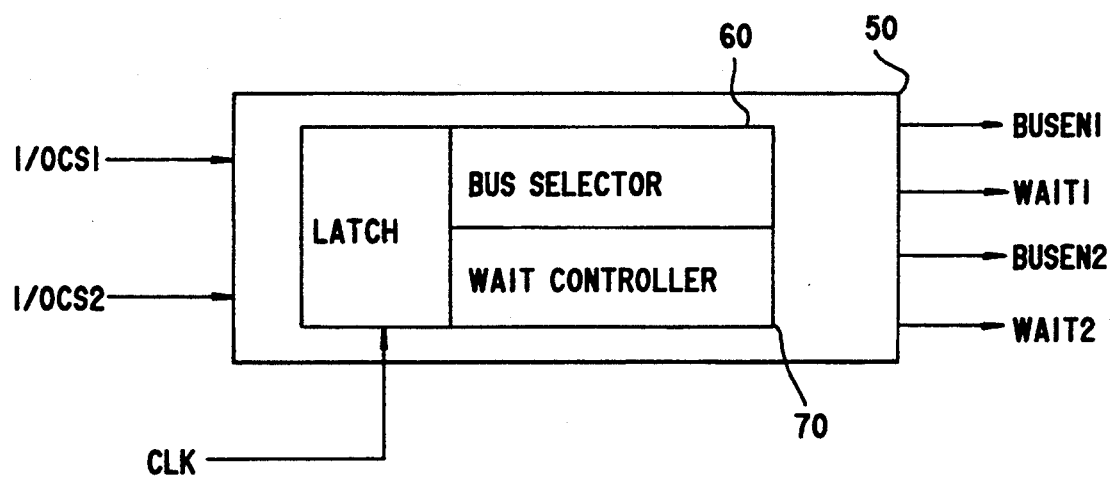
FIG. 3 is a schematic view of a bus arbitrator utilized in the above programmable controller.

As shown in FIG. 3, the bus arbitrator 50 is comprised of a bus selector 60 and a wait controller 70. It is the bus selector 60 that determines the priority between the controller units 10-1 and 10-2 by supervising the bus access signals I/OCS1 and I/OCS2, respectively, from the CPUs of the controller units 10-1 and 10-2, and provide bus select signals BUSEN1 and BUSEN2 indicative of that the controller units 10-1 and 10-2 are enabled to access the corresponding I/O interface unit through the common I/O bus 20. The wait controller 70 is provided to output wait signal WAIT1 and WAIT2 to the wait controller W1 and W2 of the controller units 10-1 and 10-2, respectively. The wait signal WAIT1 and WAIT2 are responsible for deferring the access of the controller units 10-1 and 10-2 to the common I/O bus 20 and are also cooperative with the bus select signals BUSEN1 and BUSEN2 from the bus selector 60, respectively in order to give a sufficient time frame for the CPU of the controller units in accessing the common I/O bus 20, such that only one of the two controller units is allowed to access the I/O bus 20 while inhibiting the other controller unit from accessing the I/O bus 20 when the bus access signals I/OCS1 and I/OCS2 are recognized within one bus cycle of the controller unit 10-1 or 10-2.

Figure 4:
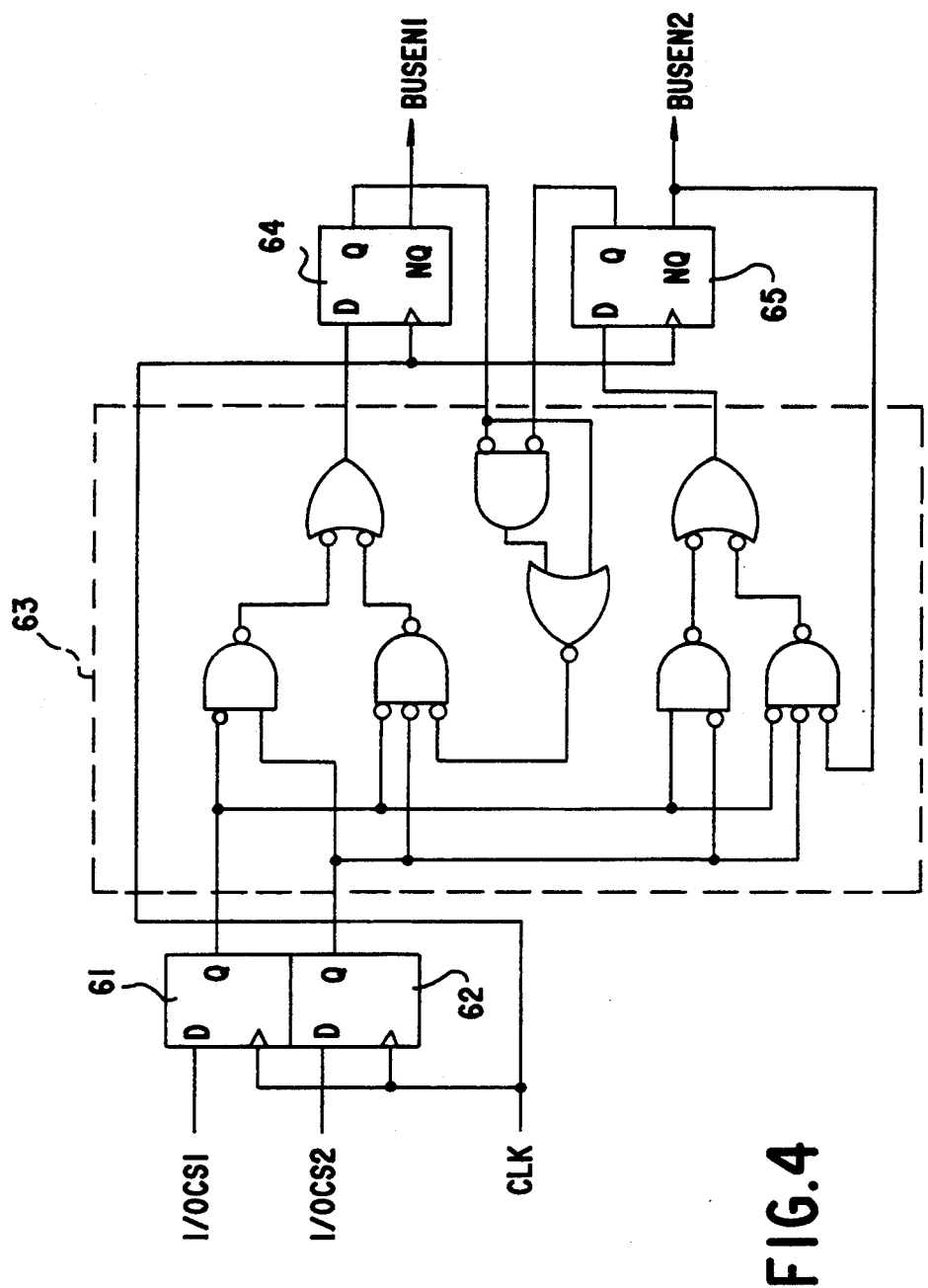
FIG. 4 is a logic circuit of a bus selector consisting the above bus arbitrator.

The bus arbitrator 50 is fed by a sampling clock CLK which provides a basis for determining the priority at the arbitrator 50, width of the wait signals, and the time frame in which the CPU of the controller unit is allowed to access the I/O bus 20. FIG. 4 illustrates a schematic circuit diagram of the bus selector 60 which includes a pair of D-type flip-flops 61 and 62 receiving the inputs of the bus access signals I/OCS1 and I/OCS2 respectively together with the sampling clock CLK, a logic circuit 63 for determination of the priority, and a pair of D-type flip-flops 64 and 65 which output the bus select signal BUSEN1 and BUSEN2, respectively. The logic circuit 63 is designed to satisfy a logic table listed below:

TABLE

| Condition no. | Input conditions bus access request from controller unit 10-1 & 10-2 | | Controller units currently in access | Bus access signal to be produced | Wait signal to be produced |
|---|---|---|---|---|---|
| | I/OCS1 | I/OCS2 | | | |
| 1 | L | L | none | none | none |
| 2 | H | L | none | BUSEN1 | none |
| 3 | L | H | none | BUSEN2 | none |
| 4 | H | H | none | BUSEN1 | WAIT2 |
| 5 | H | H | 10-1 | BUSEN1 | WAIT2 |
| 6 | H | H | 10-2 | BUSEN2 | WAIT1 |

At the bus selector 60, the sampling clock CLK provides a basis for the determination of the priority of the bus access signal I/OCS1 and I/OCS2. That is, any one of I/OCS1 and I/OCS2 that is received in a preceding cycle of the sampling clock CLK is given priority over the other which is received in a succeeding cycle of CLK. When both of I/OCS1 and I/OCS2 are received within one cycle of CLK, the bus selector 60, in response to this simultaneous occurrence of the signals, selects one of the controller units, in this instance, the unit 10-1 as a prior unit which is preselected to be given priority to the other. Condition no. 4 in the above table corresponds to such simultaneous occurrence. In this condition, therefore, the bus selector 60 produces the bus select signal BUSEN1 which allows the controller unit 10-1 to access the corresponding I/O interface unit or units through the common I/O bus 20. Condition nos. 4, 5, and 6 indicate a state in which one of the bus access signals I/OCS1 and I/OCS2 from the corresponding one of the controller units 10-1 and 10-2 is received during the one bus cycle of the other controller unit. In such conditions, the wait controller 70 responds to produce the wait signal WAIT1 and WAIT2 to the corresponding one of the controller units 10-1 and 10-2 in order to defer the access thereof to the common I/O bus 20 until the other controller unit, i.e., the prior controller unit completes its bus cycle of completing the access to the common I/O bus 20. Upon completion of the control by the prior controller unit, the other controller unit is enabled to access to the common I/O bus 20 for controlling the corresponding I/O interface unit or units.

The bus select signal BUSEN1 and BUSEN2 are produced from the bus selector 60 when the following relations are satisfied.

$$BUSEN1 = (I/OCS1 \cap \overline{I/OCS2}) \qquad \text{No. 2}$$

$$\cup (I/OCS1 \cap I/OCS2) \cap (\overline{BUSEN1_{t-1}} \cap \overline{BUSEN1_{t-1}}) \qquad \text{No. 4}$$

$$\cup (I/OCS1 \cap I/OCS2) \cap (BUSEN1_{t-1}) \qquad \text{No. 5}$$

$$BUSEN2 = (\overline{I/OCS1} \cap I/OCS2) \qquad \text{No. 3}$$

$$\cup (I/OCS1 \cap I/OCS2) \cap (BUSEN1_{t-1}) \qquad \text{No. 6}$$

The wait controller 70 of the bus arbitrator 50 operates to produce the wait signals WAIT1 and WAIT2. The wait signals WAIT1 and WAIT2 are defined such that the wait controller 11-1 and 11-2 in the controller units 10-1 and 10-2 are authorized to determine the bus cycle of the individual CPUs for accessing the common I/O bus 20 when the wait signal WAIT1 and WAIT2 to the wait controllers 11-1 and 11-2 are at high level and that wait controller 70 of the bus arbitrator 50 takes over to determine the bus cycle of the CPUs of the respective controller units 10-1 and 10-2 when the wait signal WAIT1 and WAIT2 are at low levels [$\overline{WAIT1}$ and $\overline{WAIT2}$]. It is noted in this connection that WAIT1 and WAIT2 become low as a consequence of that the such state is acknowledged between I/OCS1 and I/OCS2. Within the low level period of the bus access signals [$\overline{WAIT1}$ and $\overline{WAIT2}$], the bus arbitrator 50 responds to stall the CPU in one of the controller units 10-1 and 10-2 producing the bus access signal later until the CPU of the other controller unit completes the access to the I/O bus, which is acknowledged on the side of the bus arbitrator 50 by BUSEN1 or BUSEN2. Thereafter, the bus arbitrator 50 still keep producing low level $\overline{WAIT1}$ or $\overline{WAIT2}$ for a certain period determined by the wait controller 70 sufficient for completing the access to the I/O bus. Subsequently, the bus arbitrator 50 responds to again produce high level WAIT1 and WAIT2 so that the wait controllers 11-1 and 11-2 takes over.

The wait signals WAIT1 and WAIT2 are produced when the following relations are satisfied.

WAIT1 = I/OCS1 ∩ I/OCS2 ∪ BUSEN2$_{t-1}$

WAIT2 = (I/OCS1 ∩ I/OCS2) ∩ {(BUSEN1$_{t-1}$ ∩ BUSEN2$_{t-1}$) ∪ (BUSEN1$_{t-1}$)}

Figure 5:
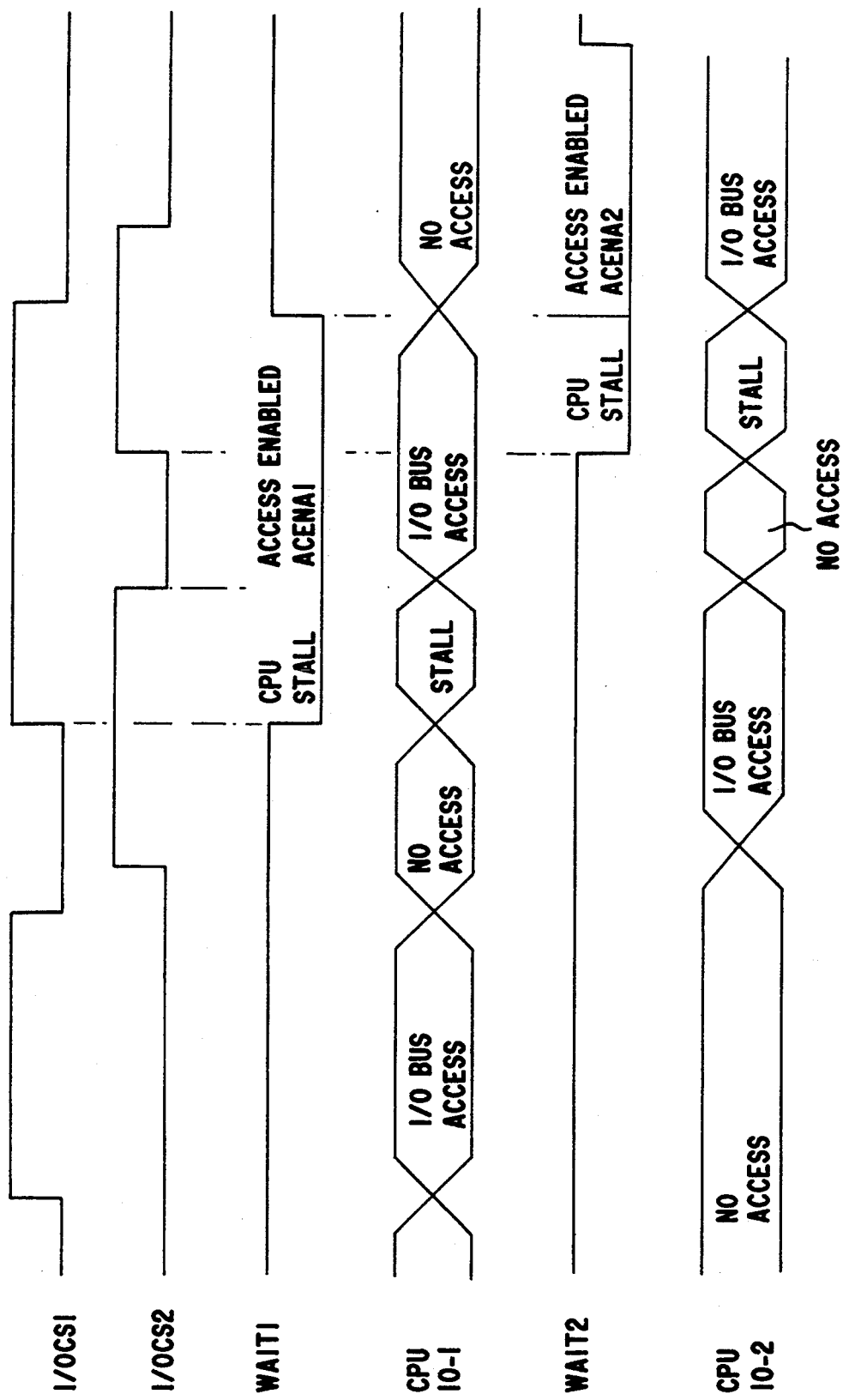
FIG. 5 is a timing chart illustrating the operation of the bus arbitrator.

Operation of the bus arbitrator 50 is now explained with reference to the timing chart of FIG. 5 illustrating one example which includes the following three consecutive stages:

1) a first stage in which the controller unit 10-1 produces the bus access signal I/OCS1 in the absence of I/OCS2 from the other unit 10-2 [first stage];
2) a second stage in which the controller unit 10-2 produces I/OCS2 followed by the other controller unit 10-1 producing I/OCS1 while I/OCS2 is active; and
3) a third stage in which the controller unit 10-2 produces I/OCS2 followed by the controller unit 10-1 producing I/OCS1 while I/OCS1 is active.

During the first stage in which only one of the controller is requested to access, the bus arbitrator 50 produces BUSEN1 and $\overline{BUSEN2}$, while keeping WAIT1 and WAIT2 at high level, whereby allowing only the controller unit 10-1 to access the I/O bus for complete the control over the associated I/O interface unit or units within one bus cycle determined by the internal wait controller 11-1. In the second stage where I/OCS1 is produced while I/OCS2 is still active to continue accessing of the controller unit 10-2 to the I/O bus, the bus arbitrator 50 acknowledges the contention between I/OCS1 and I/OCS2 and determines the controller unit 10-2 as the prior unit and the other controller unit 10-1 as the posterior unit. At this occurrence, the arbitrator 50 produces for the posterior unit 10-1 the wait signal $\overline{WAIT1}$, prohibiting it from accessing the I/O bus until the I/O bus is released by the prior unit 10-2. As soon as the I/O bus is released, the arbitrator 50 produces BUSEN1 instead of BUSEN2, thereby allowing the controller unit 10-1 to access the I/O bus. Upon this occurrence, the bus arbitrator 50, or the wait controller 70 thereof provides an internal signal (not shown) which causes $\overline{WAIT1}$ to be kept for a certain period of time, in order to prolong the low level state $\overline{WAIT1}$ under the control of the bus arbitrator 50 for a sufficient time, thereby affording the above time frame in which the controller unit 10-1 is allowed to access the I/O bus 20. In this sense, the low level state of $\overline{WAIT1}$ caused after the contention and given to the controller unit 10-1 can be functionally divided into a "CPU STALL" interval and an "access enable ACENA1" interval in this order, as indicated in FIG. 5. The CPU STALL interval starts with a slight delay from the beginning of I/OCS1 and ends substantially at a timing of the prior controller unit 10-2 completes the access to the I/O bus 20, i.e., at the timing of producing BUSEN1. The access enable ACENA1 interval starts from the end of the access wait CPU STALL and continues for a sufficient time interval to define the time interval within which the CPU of the controller unit 10-1 is allowed to access the I/O bus 20 for complete the control over the associated I/O interface unit or units. In the third stage, the bus arbitrator 50 acts oppositely but in a like manner as in the second stage to provide $\overline{WAIT2}$ period composed of CPU STALL and access enable ACENA2 intervals.

Figure 6:
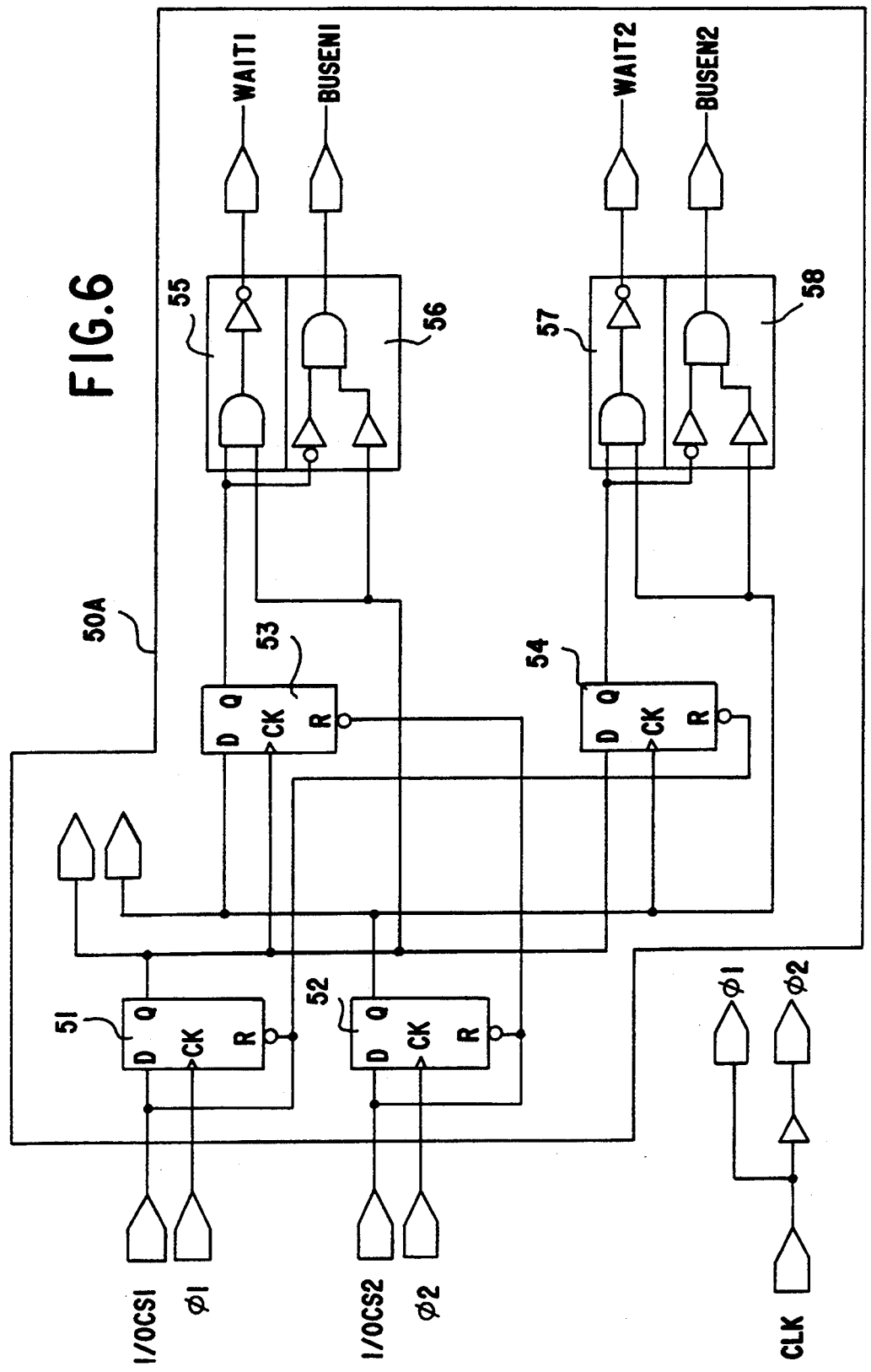
FIG. 6 is a logic circuit of another bus arbitrator which may be utilized in the above controller system.
Figure 7:
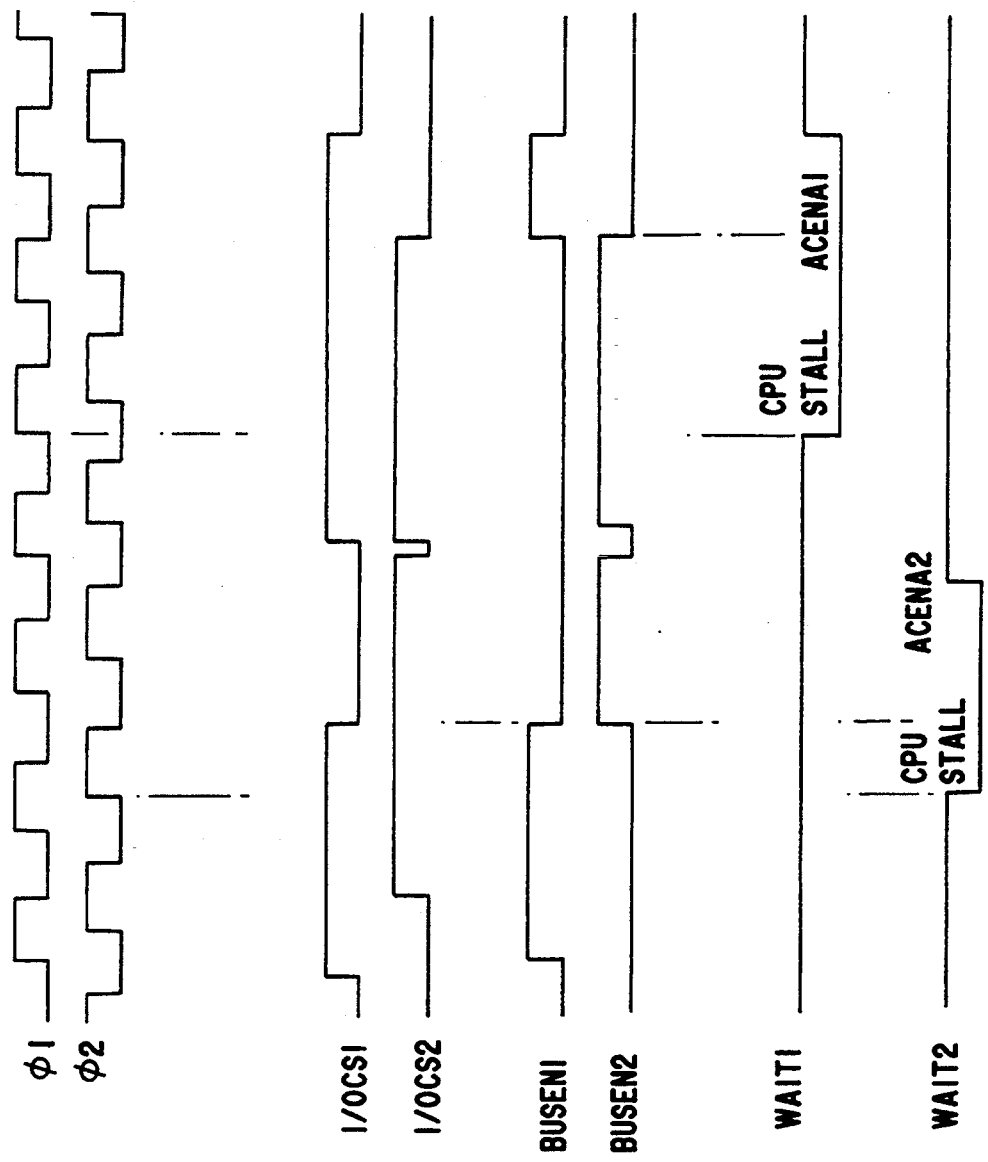
FIG. 7 is a timing chart illustrating the operation of the bus arbitrator of FIG. 6.
Figure 8:
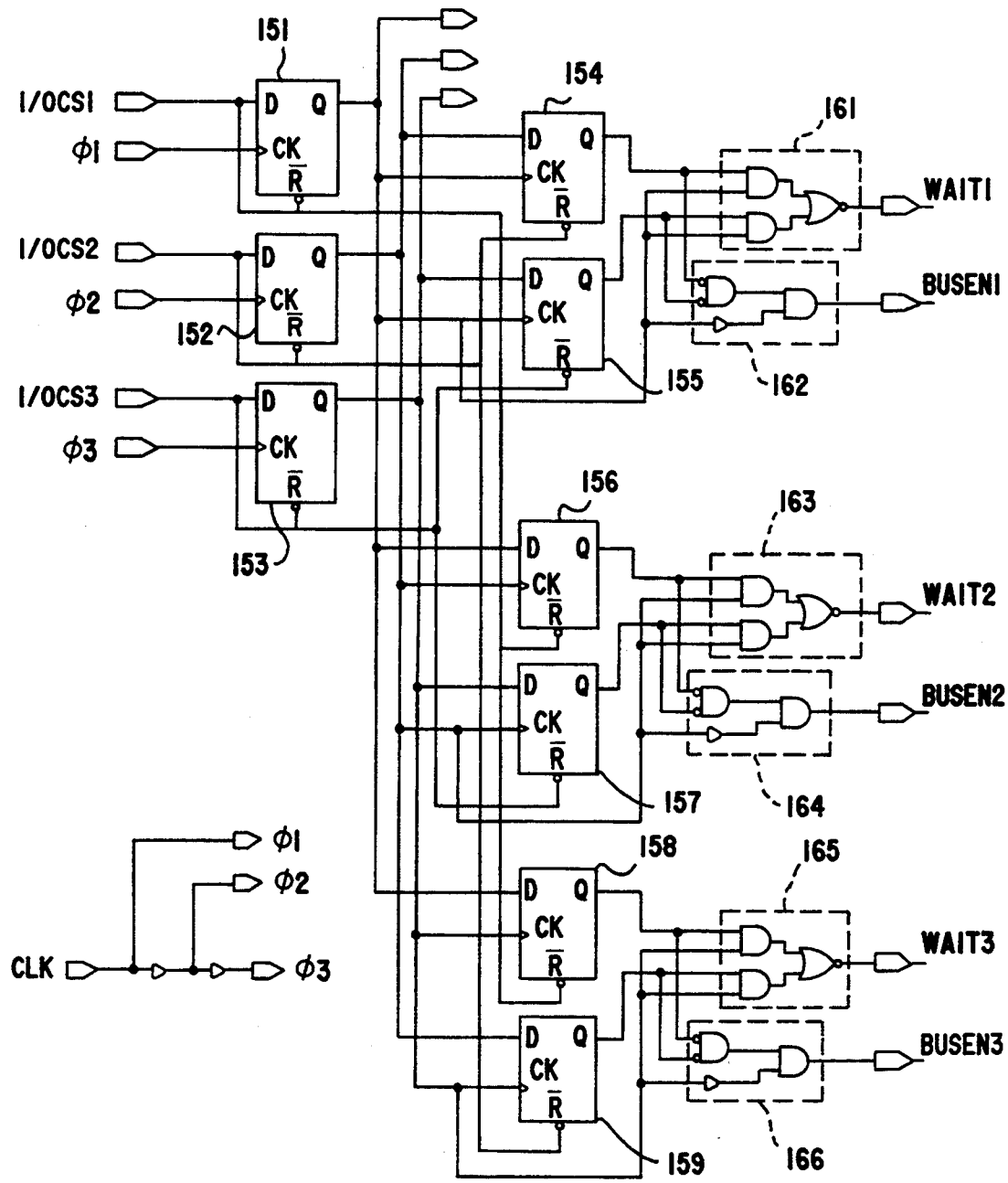
FIG. 8 is a logic circuit of a further bus arbitrator which may be utilized in a programmable controller system having three controller units with individual CPUs.

Alternately, another bus arbitrator 50A may be employed instead in order to avoid simultaneous contention or concurrent acknowledgment of the bus access signals I/OCS1 and I/OCS2 from the two controller units 10-1 and 10-2. As shown in FIGS. 6 and 7 which illustrate the block circuit diagram and the timing chart, the bus arbitrator 50A is fed by two sampling clocks $\phi 1$ and $\phi 2$ of different phases such that I/OCS1 and I/OCS2 are respectively acknowledged at the rise time of the clocks $\phi 1$ and $\phi 2$. I/OCS1 and I/OCS2 are latched respectively at flip-flops 51 and 52. Another pair of flip-flops 53 and 54 is included to determine the priority between I/OCS1 and I/OCS2 in such a manner that flip-flop 53 latches the output of flip-flop 52 at a timing of flip-flop 51 latching I/OCS1 and that flip-flop 54 latches the output of flip-flop 51 at a timing of flip-flop 52 latching I/OCS2. Also included are logic circuits 55 to 58 which produce the bus access signals BUSEN1 and BUSEN2 as well as the wait signals WAIT1 and WAIT2.

Operation of the bus arbitrator 50A is illustrated in the timing chart of FIG. 7. As seen from FIG. 7, the bus arbitrator 50A operates in the identical manner as the above mentioned arbitrator 50 except that I/OCS1 and I/OCS2 are acknowledged at different timings respectively defined by clocks $\phi 1$ and $\phi 2$. Therefore, no duplicate explanation is deemed necessary.

Figure 9:
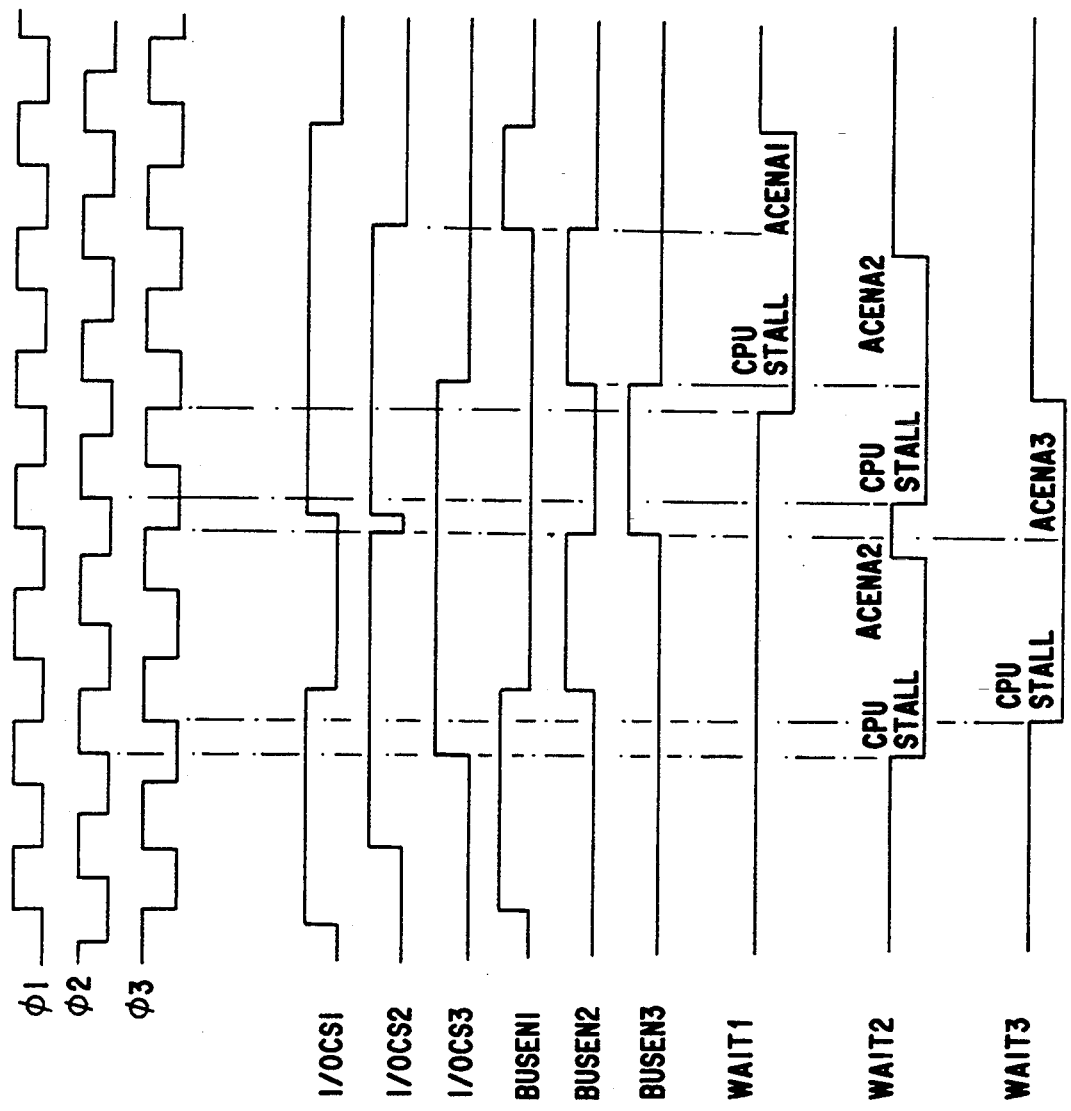
FIG. 9 is a timing chart illustrating the operation of the bus arbitrator of FIG. 8.
Figure 10A:
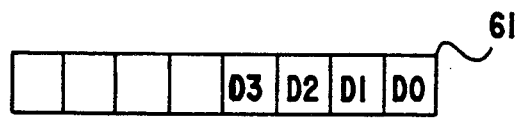
FIGS. 10A to 10D illustrate several registers included in an I/O interface unit allocator utilized in the above controller system of FIG. 1.
Figure 10B:
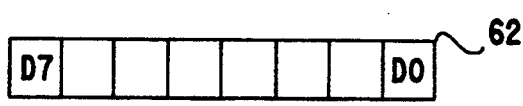
Figure 10C:
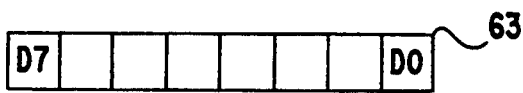
Figure 10D:

Although the above embodiment is described with regard to the dual CPU system with a pair of controller units each including the individual CPU, the present invention is not limited thereto and can be equally applicable to a three CPU system having three controller units each including the individual CPU for control of the associated I/O interface units independently from each other. In this case, the system includes a modified bus arbitrator 150 of FIG. 9 in which three sampling clocks $\phi 1$, $\phi 2$, and $\phi 3$ are utilized to acknowledge I/OCS1, I/OCS2, and I/OCS3 from the three controller units in order to avoid concurrent contention as seen in the bus arbitrator 50A of FIG. 6. To this end, the bus arbitrator 150 comprises flip-flops 151 to 159 for priority determination among I/OCS1, I/OCS2 and I/OCS3 and also logic circuits 161 to 166 for producing the bus access signals BUSEN1, BUSEN2 and BUSEN3 as well as the wait signals WAIT1, WAIT2, and WAIT3. As seen in the timing chart of FIG. 9, the operations of the bus arbitrator 150 are of the same principle as the above mentioned bus arbitrator 50A. Therefore, no further explanation is deemed necessary.

Now, discussion is made to the I/O interface unit allocator 80 included in the system to correlate the individual I/O interface units 30-0 to 30-7 with the controller units 10-1 and 10-2 such that each I/O interface unit is set to be controlled exclusively by one of the controller units or commonly by the two controller units 10-1 and 10-2. To this end, the allocator 80 includes registers 81 to 84 of an 8-bit structure.

Register 81 is provided as a status register in order that the controller units 10-1 and 10-2 can identify by themselves as to the location on the base board 40, i.e., which of the units is mounted into which of the no. 1 and the no. 2 slots in the base board 40. A first bid D0 of register 81 is utilized to indicate that either of the controller units is mounted into the no. 1 slot when "1" is entered and into no. 2 slot when "0" is entered. That is, the system can identify the controller unit as the unit 10-1 when mounted in the no. 1 slot and as the unit 10-2 when mounted in the no. 2 slot. A fourth bit D3 is utilized to see whether additional controller unit is mounted or not. That is, "1" in bit D3 indicates the presence of the additional unit while "0" in bit D3 indicates the absence thereof. The remaining bits are left inoperative or no-op instruction.

Register 82 is provided as an exclusive-use register with D0 to D7 bits corresponding to the I/O interface units 30-0 to 30-7 for setting the individual I/O interface units as being controlled exclusively by one of the controller units 10-1 and 10-2. That is, when "1" is entered in the bit, the corresponding I/O interface unit is to be controlled exclusively by the controller unit 10-1, while it is to be controlled exclusively by the other controller unit 10-2 when "0" is entered in the bit. It is noted that even if the controller unit should control any one of non-designated I/O interface unit, no data renewal is made for the output of that I/O interface unit, as well as for the input to the controller unit therefrom.

Register 83 is provided as a common-use register with D0 to D7 bits corresponding to the I/O interface units 30-0 to 30-7 for setting the individual I/O interface units as being commonly controlled by the two controller units 10-1 and 10-2. When "1" is entered in a given bit, the corresponding I/O interface unit is set to be controlled commonly by the two controller units. This setting override the setting in the exclusive-use register 82. Otherwise, "0" is entered in a given bit, the corresponding I/O interface unit is set to be exclusively controlled in accordance with the setting in the exclusive-use register 82.

Register 84 is provided as a write register of which first bit D0 is linked to D3 bit of the status register 81 such that when "1" is entered in the D0 bit of register 84 either one of the controller units 10-1 or 10-2 checks whether the other controller unit is mounted on the base board 40 or not. Thus, "1" at the D0 bit acts as an additional CPU search flag for the above check.

Figure 11:
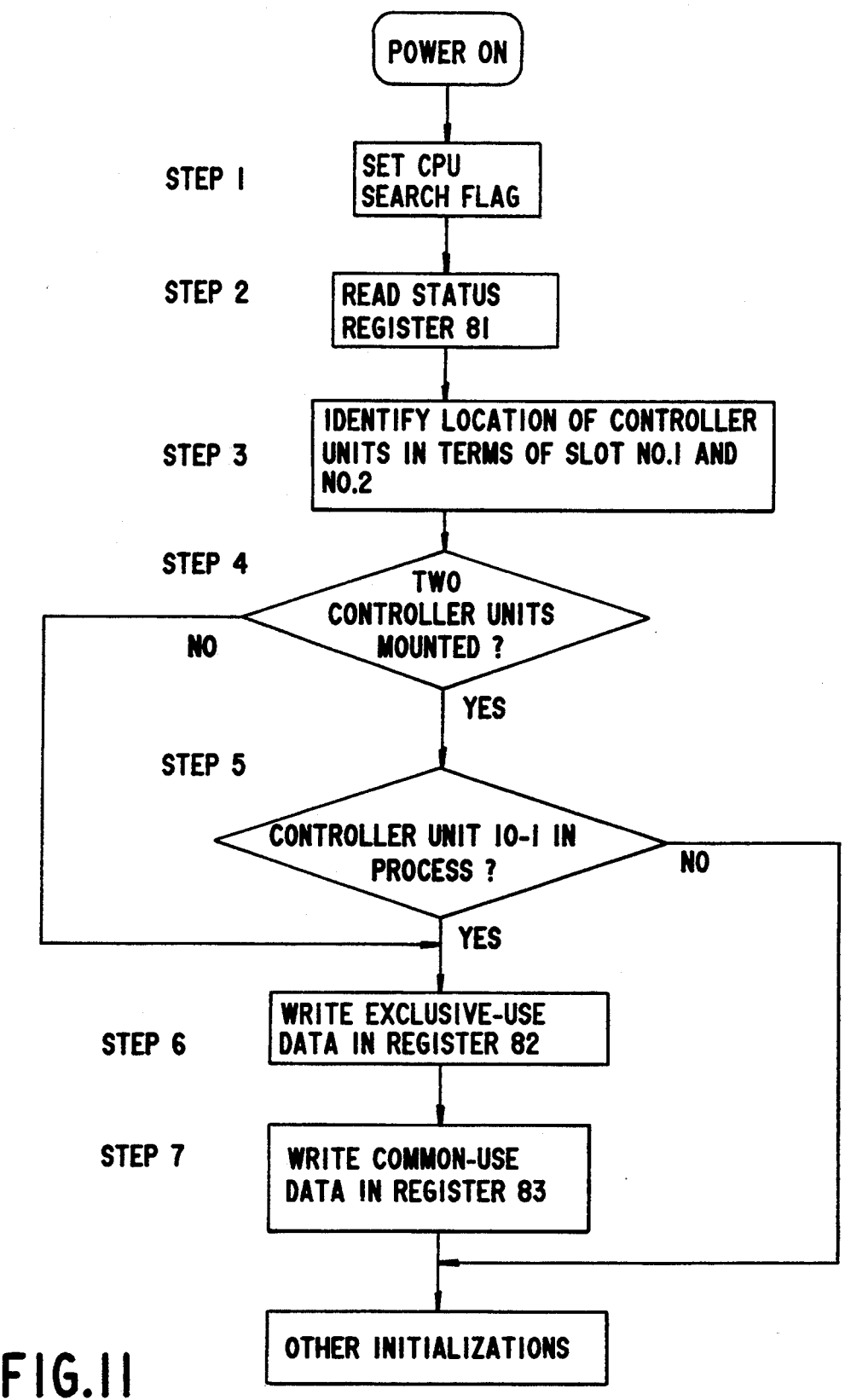
FIG. 11 is a flow chart illustrating the operation of the I/O interface unit allocator.

FIG. 11 illustrates a flow chart for the operation of the thus configured I/O interface unit allocator 80.

Upon energization of the system, the CPU search flag is set in the write register 84 such that the system can check whether the system includes one additional controller unit [step 1]. Then, content of the status register 81 is read [step 2], based upon which the allocator 80 identifies as the location of the controller unit or units on the base board 40 in terms of the slot numbers [step 3]. Then, it is judged whether two controller units are mounted or a single controller unit is mounted [step 4]. If only a single controller units is identified on the base board 40 at step 4, then a routine jumps to a step 6. Otherwise, when two controller units are identified on the base board 50, the allocator 80 checks whether the controller unit 10-1 in no. 1 slot is being processed [step 5]. If not, the routine proceeds to other initialization sequence of the system. If the controller unit 10-1 is acknowledged as being processed, the allocator 80 allows the writing into the exclusive-use register 82 exclusive-use data indicating which of the I/O interface units 30-0 to 30-7 is or are exclusively controlled by which one of the controller units [step 6] followed by common-use data being written into the common-use register 83 indicating which of the I/O interface units 30-0 to 30-7 is or are commonly controlled by the two controller units 10-1 and 10-2 [step 7], after which the routine goes to the other initialization sequence. As seen in the flow chart, when two controller units are recognized on board, the controller unit 10-1 in the no. 1 slot is made responsible writing the exclusive-use and common-use data into registers 82 and 83. On the other hand, when only one of the controller units is recognized, the on-board controller unit becomes responsible for writing the data into the registers. By completing the above sequence, the controller units 10-1 and 10-2 are enabled to independently control from each other the associated I/O interface units.

Figure 15:
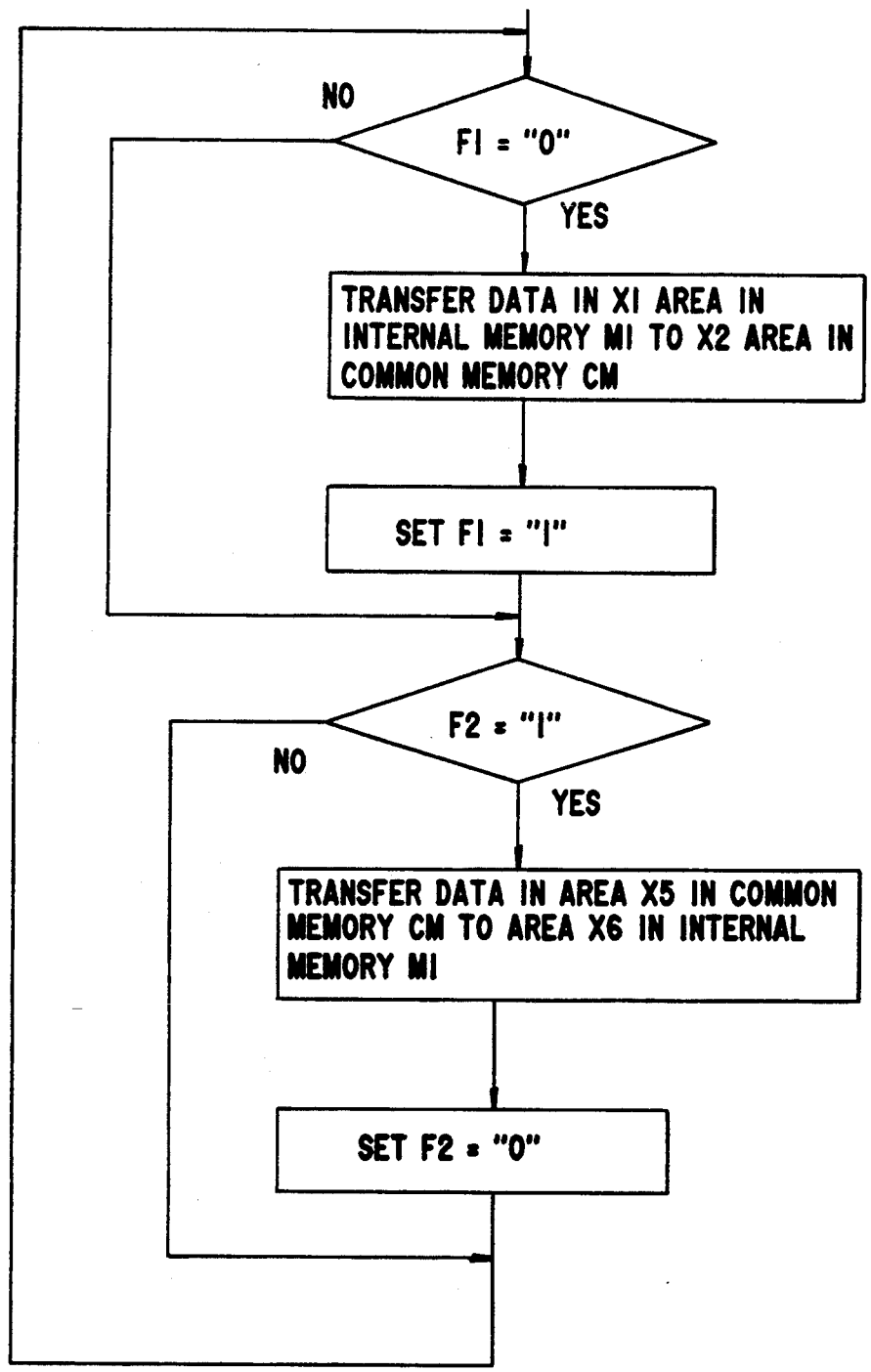
FIG. 15 and 16 are flow charts illustrating the data transfer operation between the internal memories of the controller units through the common memory.
Figure 16:
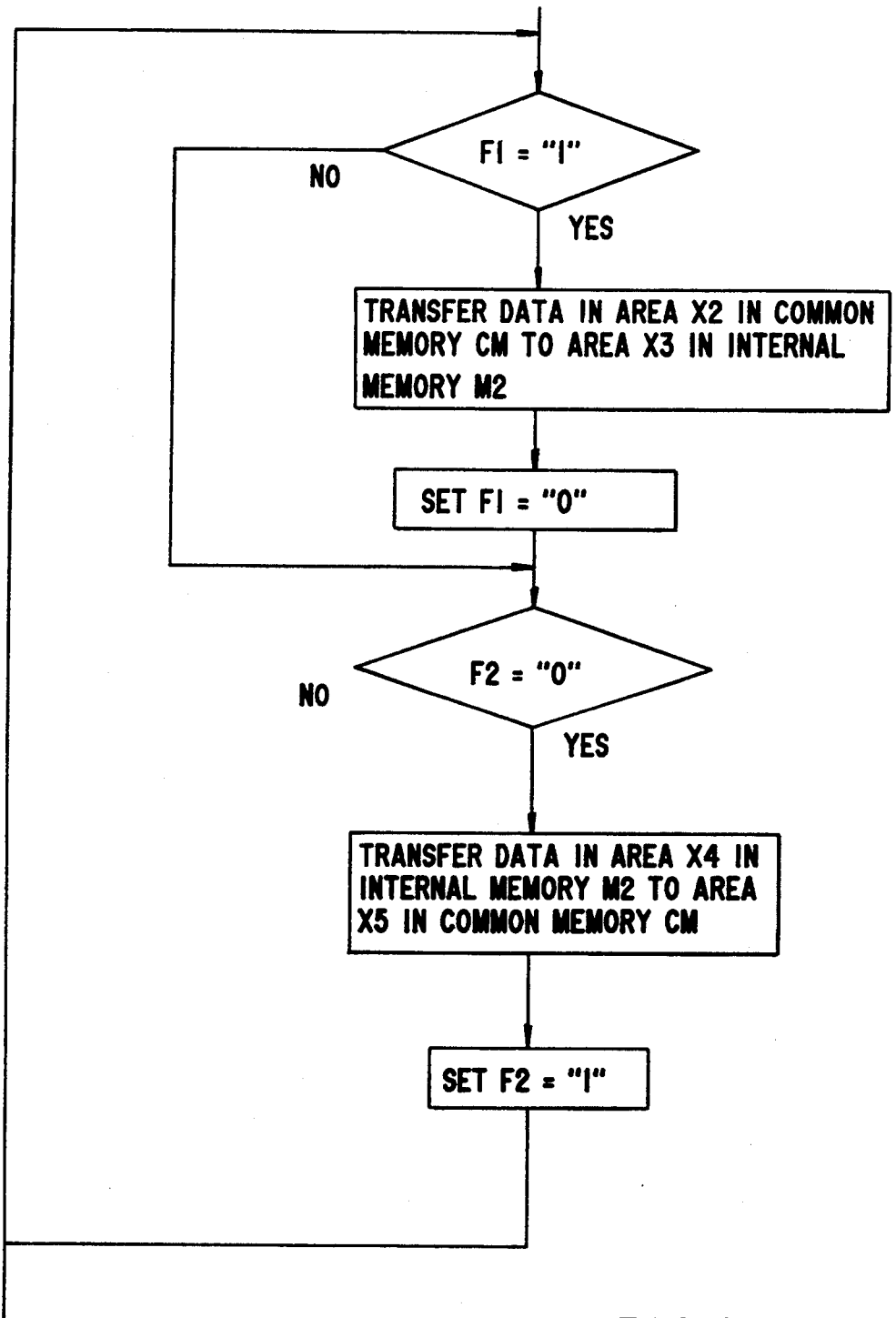

Now, a discussion is made to the data transfer between the internal memories M1 and M2 of the controller units 10-1 and 10-2 by the use of the common memory CM with reference to FIGS. 12 to 14. The common memory CM is a dual-port RAM of which ports are respectively connected to the internal memories M1 and M2. One example of the data transfer is a data area dependent method in which each of the internal memories M1 and M2 is configured to have a particular exchange data area therein for storing data to be exchanged through the common memory CM. That is, as schematically shown in FIG. 13A, each of the internal memories M1 and M2 is configured to commonly store transfer-designation data A and B for the number of words and the beginning of address respectively written by the controller unit 10-1; and transfer-designation data C and D for the number of words and the beginning of address respectively written by the controller unit 10-2, in addition to data to be transferred together with the actual data between M1 and M2 through CM under the control of the CPU of the controller units as an internal system processing separately from a user defined program. The common memory CM is configured to store, in addition to the actual data to be transferred, write flags F1 and F2 indicating as to whether the data have been transferred into the common memory CM from the internal memories M1 and M2 of the controller units 10-1 and 10-2, respectively. When "1" is assigned to F1 and F2, it indicates that the data have been transferred into the common memory CM. Otherwise, "0" in F1 and F2 indicates that data have not been transferred. The above data transfer is accomplished in accordance with the flow charts of FIGS. 15 and 16. FIG. 15 illustrates the data transfer between the internal memory M1 of the controller unit 10-1 and the common memory CM, in which data in area X1 in the internal memory M1 is transferred to area X2 in the common memory CM and data in area X5 of CM is transferred to area X6 of M1, as schematically shown in FIG. 14. FIG. 16 illustrates the data transfer between the internal memory M2 of the controller unit 10-2 and the common memory CM, in which data in area X2 in the common memory CM is transferred to area X3 in the internal memory M2 and data in area X4 of M2 is transferred to area X5 of CM.

Alternately, it is possible to transfer data between the internal memories M1 and M2 through the common memory CM by the use of a special instruction executed in correspondence to instructions used in the user defined program. The instruction comprises a write instruction and read instruction, as schematically shown in FIGS. 17A and 17B, respectively. The write instruction of FIG. 17A is responsible for transferring data from the internal memory of one of the controller units to the internal memory of the other. That is, when the write instruction is programmed for the CPU of the controller unit 10-1, data transfer is made from M1 to M2, and when it is programmed for the CPU of the controller unit 10-2, data transfer is made from M2 to M1. The read instruction of FIG. 18B is responsible for the like data transfer between M1 and M2, but in the opposite direction. In the figures, "W" and "R" indicate instructions for condition of execution, respectively. As shown in FIG. 17A, the write instruction comprises an operation code FN0, a source address SRC indicating the beginning of the source address in the internal memory M1 or M2, the number of words WRD of the data to be transferred from M1 or M2, and a destination address DST indicating the beginning of the destination address in the internal memory M1 or M2. The read instruction comprises, as shown in FIG. 17B, an operation code FN1, a source address SRC indicating the beginning of the source address in the internal memory M1 or M2, the number of words WRD of the data to be transferred from M1 or M2, and a destination address DST indicating the beginning of the destination address in the internal memory M1 or M2.

The write and read instructions are stored in the internal memories M1 and M2, as schematically shown in FIG. 18A. The common memory CM is correspondingly configured to store write flags FW1 and FW2 indicating whether the data have been written or transferred together with the destination address DST to the common memory CM from the internal memory M1 and M2, respectively; read flags FR1 and FR2 indicating as to whether there is requested to read and transfer the data from the common memory CM to the memories M1 and M2, respectively; and the source address SRC, the number of words WRD, and destination address DST for each of M1 and M2. When "1" is given to FW1 and FW2, it indicates that the data have been written or transferred to the common memory CM. Otherwise, when "0" is given, FW1 and FW2 indicate that the data have not been written or transferred to CM. Likewise, FR1 and FR2 indicate that the data have been respectively read from CM to M1 and M2 when "1" is given, and not been read when "0" is given.

When FW1 or FW2 is given "1" in the common memory CM, the CPU of the corresponding controller unit 10-2 or 10-1 to which internal memory M2 or M1 the data is destined, the CPU of the destined controller unit 10-2 or 10-1 reads the data and writes to its internal memory M2 or M1, after which the CPU resets the flag FW1 or FW2 to "0". When, on the other hand, FR1 or FR2 is given "1" in CM, the CPU of the corresponding controller unit 10-2 or 10-1, which is requested to transfer the data into the common memory CM be read by the CPU of the other controller unit 10-1 or 10-2, reads the source address SRC and the number of words WRD and transfers so specified data from its internal memory M2 or M1 to the common memory CM, after which the CPU resets FR1 or FR2 to "0".

Figure 20:
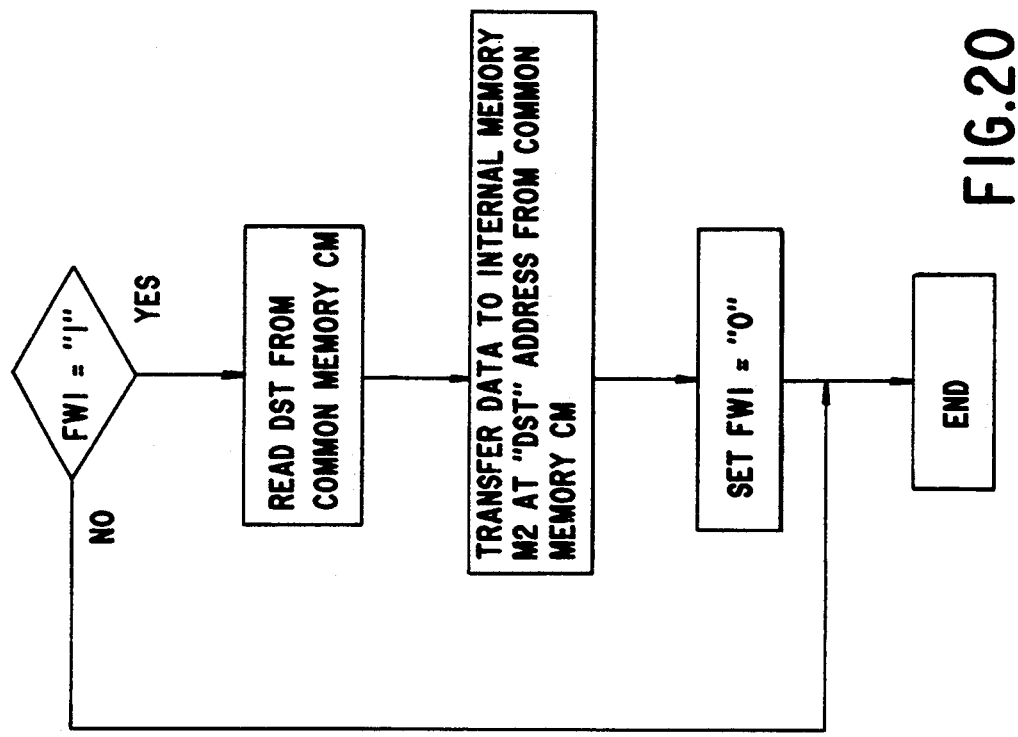
FIG. 19 to 22 are flow charts illustrating the operations of transferring data between the internal memories of the two controller units.
Figure 19:
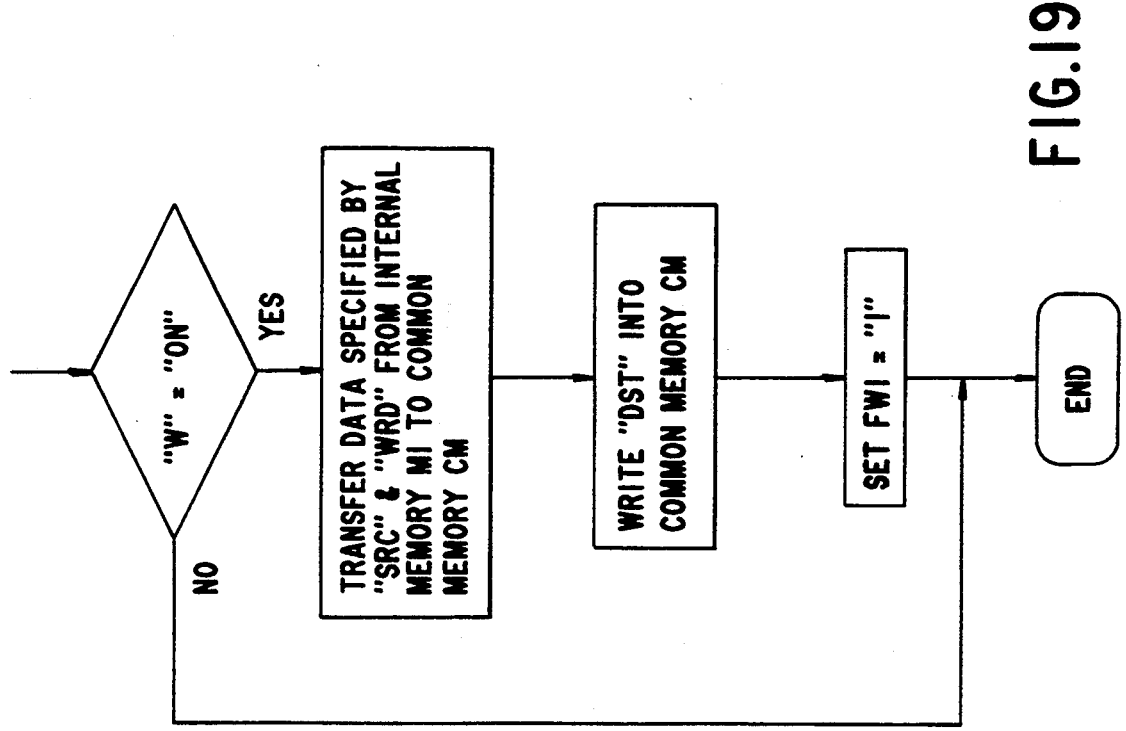
Figure 22:
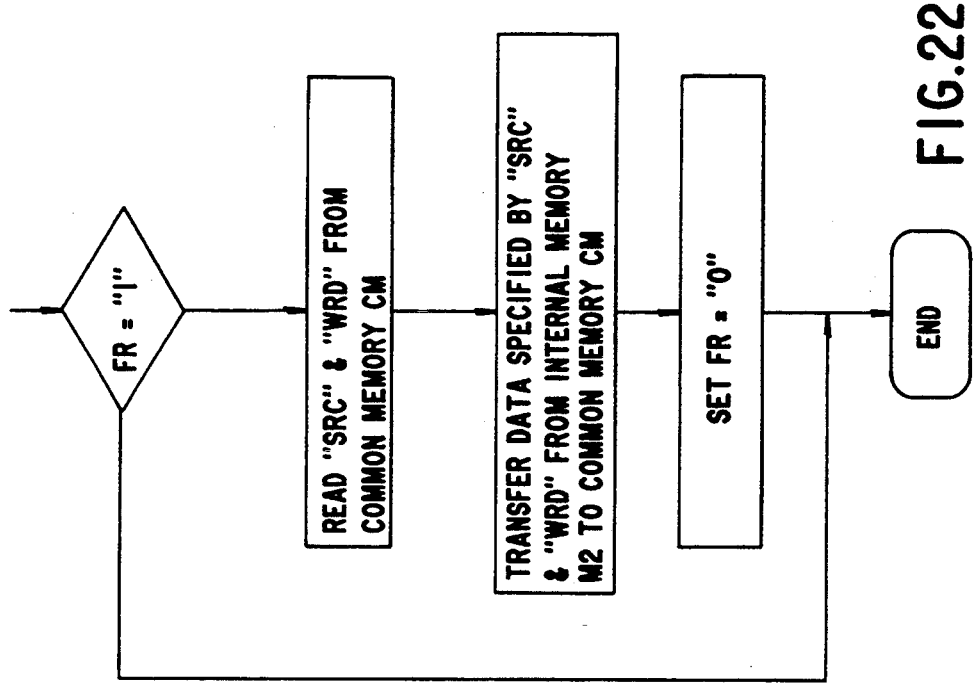
Figure 21:
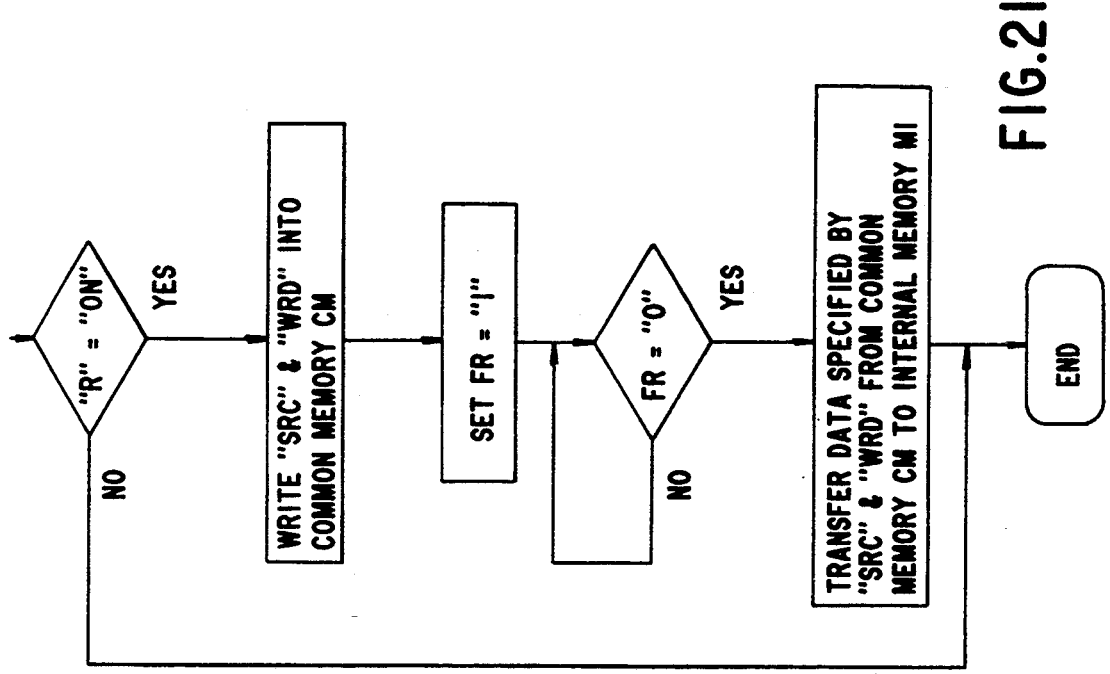

The above operations are illustrated in the flow charts of FIGS. 19 to 22. FIGS. 19 and 20 illustrates the execution of the write instruction, for example, for transferring the data from the internal memory M1 of the controller unit 10-1 to the internal memory M2 of the other controller unit 10-2 through the common memory CM. That is, the write instruction is executed in accordance with the flow chart of FIG. 19 which includes the steps in which the CPU of the controller unit 10-1 transfers the data corresponding to the specified source address S1 and the number of words WRD from the internal memory M1 to the common memory CM, and writes the destination address DST into the common memory followed by the resetting of FW1 to "1". Then, the sequence proceeds in accordance with the flow chart of FIG. 20 comprising the steps in which the destined CPU of the controller unit 10-2 reads from the common memory CM the destination address DST together with the data, transfers the data to the internal memory M2 at specified address DST followed by the resetting of FW1 to "0". FIGS. 21 and 22 illustrate the execution of read instruction, for example, for reading the data from the internal memory M2 to the internal memory M1 through the common memory CM. The read instruction is first executed in accordance with the flow chart of FIG. 21 including the steps in which the CPU of the controller unit 10-1 writes into the common memory CM the source address SRC and the number of words WRD designating the data to be read from the internal memory M2, sets FR="1" and waits until the CPU of the controller unit 10-2 responds to transfer thus specified data from the internal memory M2 to the common memory CM and resets FR="0", after which the CPU reads the thus specified data from the common memory CM to the internal memory M1. FIG. 22 illustrates the steps in which the CPU of the controller unit 10-2 operates, in response to FR="1", to read the source address SRC and the number of the words WRD requested by the CPU of the controller unit 10-1, and transfers the data specified by SRC and WRD from the internal memory M2 to the common memory CM.

Although the flow charts of FIGS. 19 to 22 illustrate the write and read instructions from the CPU of the controller unit 10-1, these instructions from the CPU of the other controller unit 10-2 can be executed in the like manner.

While the invention has been particularly shown and described in reference to preferred embodiments thereof, it will be understood by those skilled in the art that changes in form and details may be made therein without departing from the spirit and scope of the invention.

What is claimed is:

1. A multi-CPU programmable controller which operates to access one of a plurality of I/O interface units through a common I/O bus for controlling one of a plurality of equipments each connected to each associated one of said I/O interface units, said programmable controller, comprising:

a pair of controller means, each of said pair including an individual CPU for generating an access signal for selectively accessing one of said I/O interface units through said common I/O bus for control thereof within one bus cycle, wherein each of said pair of controller means operates in accordance with a specific program independently from each other;

a base board means for mounting said controller means together with said common I/O bus as well as said I/O interface units:

bus arbitrating means, provided on said base board, for generating a single sampling clock, wherein said bus arbitrating means supervises said access signals from said pair of controller means such that said bus arbitrating means determines, when said two access signals from said controller means are respectively detected at the same timing within said one bus cycle, whether to provide priority to one of said pair of controller means over the other in accordance with a predetermined priority and to assume that said one of said pair of said controller means as a prior controller means and the other one of said pair of controller means as a posterior controller means, and otherwise judges which one of said pair of controller means is first to generate the access signal when said two access signals from said pair of controller means is respectively detected within said one bus cycle to thereby provide priority to one of said pair of controller means over the other and assuming said one of said pair of controller means as a first controller means which is provided with priority and the other one of said controller means as a second controller means which is provided with a later priority, wherein said bus arbitrating means allows said first controller means to use said common I/O bus and access a corresponding one of said I/O interface units while providing a hardware-wait signal in order to stall said second controller means so long as said second controller means continue to generate the access signal within the bus cycle during which said first controller means accesses the corresponding I/O unit and the first controller means is still accessing the corresponding one of said I/O interface units, and allows said second controller means to use said common I/O bus and access a corresponding one of said I/O interface units upon completion of the access from said first controller means to the corresponding I/O interface unit.

2. A multi-CPU programmable controller which operates to access one of a plurality of I/O interface units through a common I/O bus for controlling one of a plurality of equipments each connected to each associated one of said I/O interface units, said programmable controller, comprising:

a pair of controller means each of said pair including an individual CPU for generating an access signal for selectively accessing one of said I/O interface units through said common I/O bus for control thereof within one bus cycle, wherein each of said pair of controller means operates in accordance with a specific program independently from each other;

a base board means for mounting said controller means together with said common I/O bus as well as said I/O interface units:

bus arbitrating means, provided on said base board means, for generating two sampling clocks of different phases which defines different timings, wherein said bus arbitrating means receiving the access signals from said pair of controller means, respectively, at said different timings in order to judge which one of said two controller means is first to generate the access signal when said two access signals from said controller means are respectively detected within said one bus cycle to thereby provide priority to one of said two controller means over the other and assume that said one controller means as a first controller means which is provided with priority and the other controller means as a second controller means which is provided with a later priority, wherein said bus arbitrating means allows said first controller means to use said common I/O bus and access a corresponding one of said I/O interface units while giving a hardware-wait signal in order to stall said second controller means so long as said second controller means continue to generate the access signal within the bus cycle during which said first controller means accesses the corresponding I/O interface unit and the first controller means is still accessing the corresponding one of said I/O interface units, and allows said second controller means to use said common I/O bus and access a corresponding one of said I/O interface units upon completion of the access from said first controller means to the corresponding I/O interface unit.

3. A programmable controller as set forth in either claim 1 or claim 2, wherein said base board has first and second slots for receiving therein said controller means, respectively, and wherein said base board means is provided with an I/O interface unit allocator which includes means for respectively correlating said first and second slots with said two controller means, and means for setting a common and exclusive use data for each of said I/O interface units, said common use data indicating that the corresponding I/O interface unit is commonly controlled by said two controller means, and said exclusive use data indicating that the corresponding I/O interface unit is exclusively controlled by one of said controller means which is correlated with a particular one of said slots.

4. A programmable controller as set forth in claim 3, wherein said controller means include internal memories which are respectively interconnected through a common memory provided at exterior portions of said controller means for exchanging data between said controller means, said common memory being in a form of a dual-port RAM, each of said internal memories containing therein a particular exchange data area for storing data to be exchanged between said controller means through said dual-port RAM under the control of said controller means.

5. A programmable controller as set forth in claim 3, wherein said controller means include internal memories which are respectively interconnected through a common memory provided at exterior portions of said controller means for exchanging data between said controller means, said common memory being in a form of a dual-port RAM, each of said controller means having an instruction designating specific location in each of said internal memories for transferring data specified by said specific location between said internal memories through said dual-port RAM.

6. A multi-CPU programmable controller which operates to access one of a plurality of I/O interface units through a common I/O bus for controlling one of a plurality of equipments each connected to each associated one of said I/O interface units, said programmable controller, comprising:

a plurality of controller means each including an individual CPU for generating an access signal for selectively accessing one of said I/O interface units through said common I/O bus for controlling the associated one of said equipments, wherein each controller means operates in accordance with a specific program independently from each other;

a base board means for mounting said controller means together with said common I/O bus and with said I/O interface units;

bus arbitrating means, provided on said base board means, for generating a plurality of sampling clocks of the same bus cycle but of different phases which defines different timings, wherein said bus arbitrating means respectively receives the access signals from said controller means at said different timings in order to judge an occurring sequence of said access signals respectively generated from said controller means when said access signals are recognized within said one bus cycle to thereby provide a priority order to said controller means, wherein said bus arbitrating means allows a first priority controller means to use said common I/O bus and access a corresponding one of said I/O interface units while providing a hardware-wait signal in order to stall a second priority controller means so long as said second priority controller means continue to generate the access signals within said one bus cycle during which said first priority controller means accesses the corresponding I/O interface unit and the first controller means is still accessing the corresponding one of said I/O interface units, and allows said second priority controller means to use said common I/O bus and access a corresponding one of said I/O interface units upon completion of the access from said first priority controller means to the corresponding I/O interface unit.

* * * * *